Figure 3:
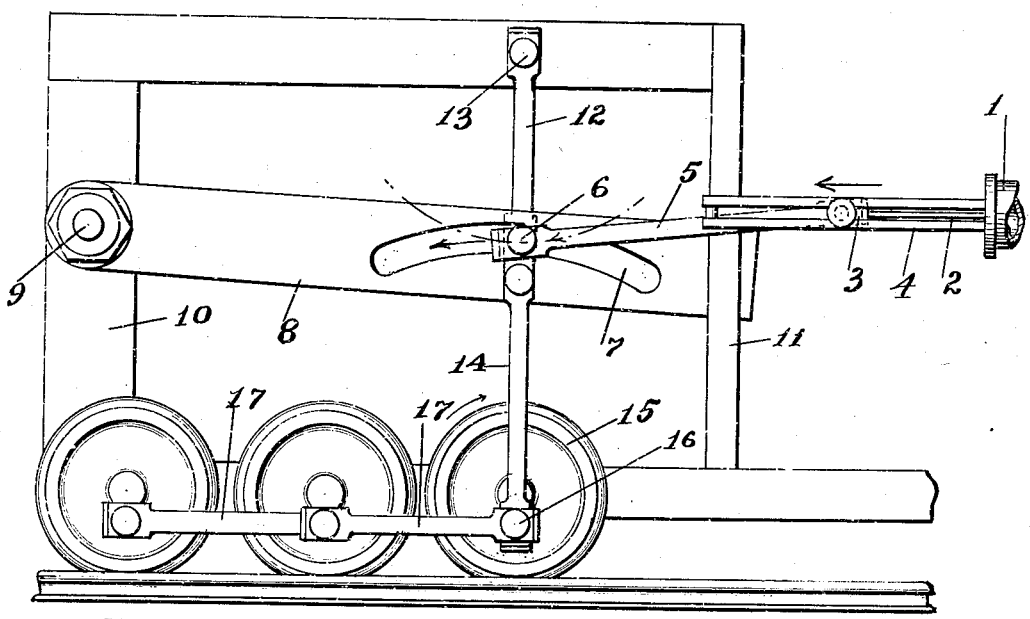

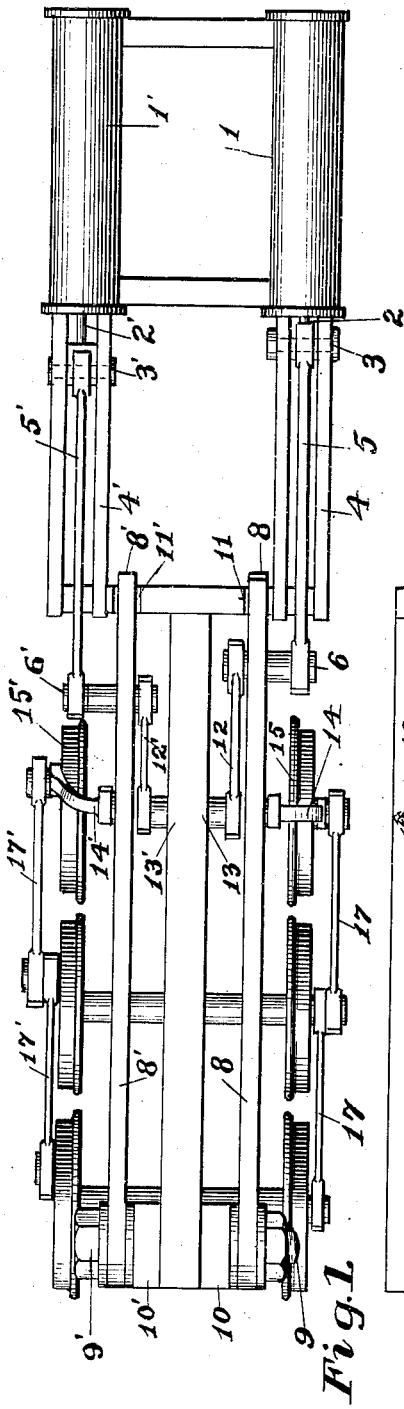

July 14, 1936.                    M. A. BREWER                    2,047,458
                              MECHANICAL MOVEMENT
                              Filed Feb. 3, 1936                2 Sheets-Sheet 2

Inventor:
Moultrie A. Brewer,
by H. M. Plaisted,
Atty.

Patented July 14, 1936

2,047,458

UNITED STATES PATENT OFFICE 2,047,458

MECHANICAL MOVEMENT

Moultre A. Brewer, Overland, Mo.

Application February 3, 1936, Serial No. 62,039

6 Claims. (Cl. 74—40)

This invention relates to certain new and useful improvements in mechanical movements, the peculiarities of which will be hereinafter fully described and claimed.

This invention relates to that class of mechanical movements in which an increase of speed of certain moving parts is obtained. More specifically, it refers to an improved mechanism interposed between a reciprocating driving member and a rotary driven member by which the latter is caused to double its rotative speed for each stroke of the former, as compared with the usual mechanical connection between said driving and driven members. For instance, the usual crank and connecting rod interposed between the piston rod of an engine cylinder and the flywheel rotated thereby, cause one-half a revolution of the flywheel for each stroke of the piston, and a complete revolution of the flywheel is effected by a forward stroke followed by a backward stroke of said piston.

My improved mechanism as herein illustrated and described, causes a full revolution of a flywheel or other rotary member, for each forward stroke of a driving piston or other reciprocating member; and a succeeding full revolution for each backward stroke of said member, thus doubling the rotative speed of said rotary member, which is the main object of my invention.

Another object is the avoidance of a dead center of the rotary member by my improved construction and arrangement.

Figure 4:
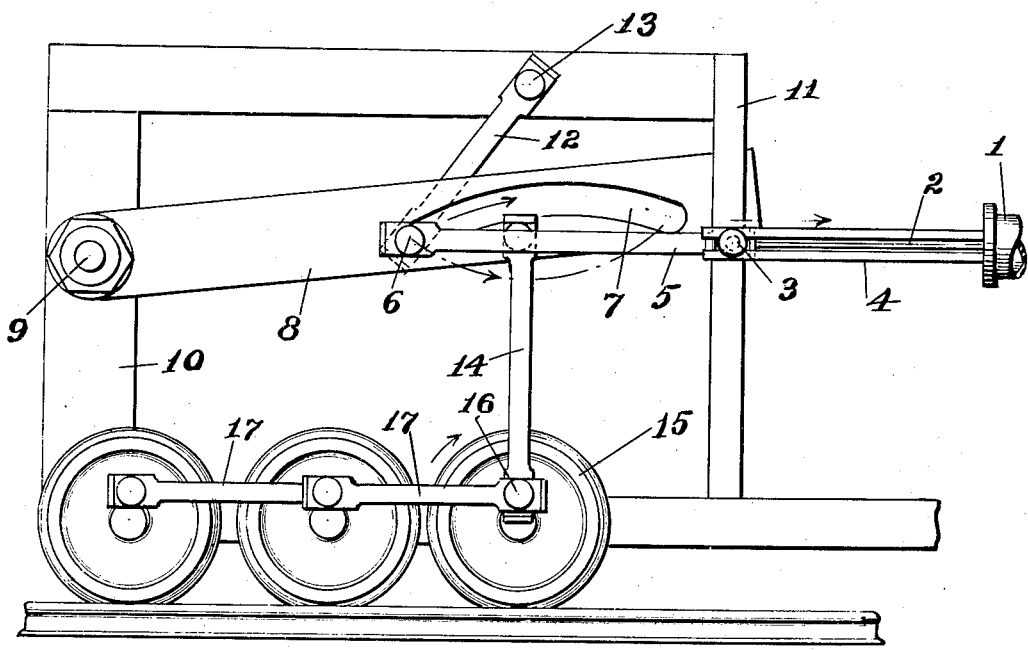

In the accompanying drawings in which like reference numerals indicate corresponding parts, Fig. 1 represents a plan of a construction embodying my invention, and showing two driving piston rods respectively at and near the beginning of their forward stroke, and my special construction interposed between said piston rods and the wheels that are rotatively speeded up thereby;

Fig. 2, a side elevation of the same;

Fig. 3, a similar side elevation showing the driving piston rod at half stroke and the driven wheels at their corresponding half revolution; and Fig. 4, a similar view showing the driving piston rod at the end of its forward stroke and the wheels at their corresponding full revolution.

Referring to the drawings, the numerals 1—1' designate a pair of horizontal engine cylinders the pistons of which are provided with the usual piston rods 2—2' and crossheads 3—3' mounted in their slides 4—4'. One of said piston rods (2' Fig. 1) has the lead over the other rod in order to avoid a dead center in the rotary members hereafter described. In certain applications of my mechanical movement, this duplicate arrangement is desired, such as when the rotary members are in the form of wheels travelling on rails or otherwise, in which case the resistance to rotation is greater than when the wheels are not in contact by their periphery, such as when the rotary member is a disc which it is desired to speed up by my present construction.

In the present illustration, the said cross-heads are provided with driving link connections 5—5', horizontally disposed and pivoted at their outer ends to wrist pins 6—6' slidingly mounted in slots 7—7' in corresponding oscillating bars 8—8' which are respectively mounted at their opposite ends on pivots 9—9' carried by vertical posts 10—10', or otherwise suitably supported, and having their slotted ends oscillating between suitable guides 11—11'. These slots 7—7' are upwardly curved and the wrist pins are moved back and forth therein by the said driving link connections and the reciprocating piston rods.

This back and forth movement of the wrist pins, and the oscillations of said slotted bars, are controlled by swing links 12—12', which are pivotally connected respectively to their corresponding wrist pins at one end, and pivoted at their other ends to beam supports, or other suitable supports, at points 13—13' which are substantially midway above the middle of the corresponding curved slots. Since the pivot points at the upper ends of said links are definitely fixed, the lower ends of said swing links and the wrist pins to which they are pivoted, will swing in an arc about their upper pivots and said arcs will be reversed from the upwardly curved slots 7—7' (Fig. 4). The downward swing of the lower ends of said swing links in the arcs in which they travel, will supplement and increase the downward motion of the oscillating ends of said bars as the wrist pins travel back and forth in said slots. An increase of the vertical movement of the vertically disposed pitmans 14—14' and a corresponding crank radius will be obtained between the centers of the rotary wheels 15—15', and the pivotal connection 16 of said pitman 14, Fig. 3.

Furthermore, when wrist pin 6, Fig. 2, is beginning its movement in the direction of the arrow, its swing link 12 causes a downward pressure of the wrist pin upon the lower edge of the slot 7, and the upward curvature of the slot is added to the downward curvature of the end of the swing link and wrist pin, so that a half revolution of the rotary member 15 is produced when the wrist pin has reached the middle of the slot in which it slides, as shown in Fig. 3. The downward movement of the pitman 14 is thus increased so that a half revolution of the wheel 15 is produced when the pitman and the swing link are in substantially the same vertical plane as shown in Fig. 3. Then when a further movement of the wrist pin from the center position, Fig. 3, to the end of the slot 7 is made, a corresponding crank movement of the wheel 15 is produced which completes a full revolution of said wheel as indicated in Fig. 4. This full movement has therefore been caused by the forward stroke of the piston, its piston rod and driving link connection with the corresponding wrist pin.

A similar full revolution of the wheel 15 will be effected by the backward stroke of the piston and its operative connections with the wrist pin 6, thus restoring it to the position shown in Fig. 2. In other words, a double revolution of the rotary wheel 15 is effected by a forward and backward movement of the piston and its operative connections to the wrist pin 6, on account of the interposed mechanism just described, which is therefore a doubling of the speed obtained by the usual crank and connecting rod between a piston rod and flywheel in the well known horizontal engine.

In some applications of my device, the rotary member 15 may be in triplicate, as shown in Fig. 2, on each side of the construction shown, and said wheels connected by the usual parallel rods 17—17' as in locomotive construction.

As stated above, the advance or lead of one of the piston rods and its operative connections, over that of the other one when arranged in pairs as shown, avoids dead centers on the rotary wheels. As will be seen from Fig. 2, the wrist pin 6 is about to start on its movement in the slot, and the lower end of its pitman is directly above the center of the wheel 15. However, the other wrist pin 6' on the opposite side of the device, has not yet completed its return travel in its slot but has a definite distance to travel as indicated by the arrow, Fig. 2. Such further action on the opposite side of the device will transmit the rotary effect of the wheel 15' to the wheel 15 and cause the end of the pitman 14 to pass its dead center.

While I have shown this device and described it specifically, I do not limit myself to the exact construction disclosed except by the appended claims.

Having thus fully described my invention what I claim is new and desire to secure by Letters Patent is:

1. A mechanical movement comprising a driving member, a rotary driven member, and interposed mechanism consisting of a pivoted oscillating bar having a curved slot, a pitman having its ends respectively pivoted to said bar and to said rotary member, a wrist pin mounted in said slot, a driving link connecting said pin to said driving member, and a controller swing link pivoted at one end to a support adjacent said slot and at its other end to said wrist pin, substantially as described.

2. A mechanical movement comprising a horizontal reciprocating driving member, a rotary driven member, an interposed mechanism consisting of a horizontally disposed bar pivoted at one end and having an upwardly curved slot near its other oscillating end, a pitman having its upper end pivoted to said bar and its lower end to said rotary member, a wrist pin slidingly mounted in said slot, a horizontally disposed driving link connecting said pin to said horizontally reciprocating driving member, and a controller swing link respectively pivoted at its upper end midway above said slot to a support and at its lower end to said wrist pin, substantially as described.

3. A mechanical movement comprising a bar pivoted at one end and having a curved slot near its other oscillating end, a rotary member, a pitman pivoted at one end to said bar and at its other end to said rotary member, a wrist pin slidingly mounted in said slot, a swing link having one end pivoted to said wrist pin and its other end to a support adjacent the oscillating end of said bar, and driving means to slide said wrist pin back and forth in said slot, substantially as described.

4. A mechanical movement comprising a horizontally disposed bar pivoted at one end and having an upwardly curved slot near its other oscillating end, a wrist pin slidingly mounted in said slot, a swing link pivoted at its upper end to a support midway above said slot and at its other end to said wrist pin to control the oscillation of said bar when said wrist pin slides in said slot, driving means pivoted to said wrist pin to slide it back and forth in said slot and oscillate said bar, and a rotary member operatively connected to said bar to rotate said member by the oscillation of said bar.

5. A mechanical movement comprising a pair of horizontally disposed bars respectively pivoted at one end and having an upwardly curved slot near the other oscillating end, wrist pins respectively mounted to slide in said slots, driving means to slide said wrist pins back and forth in their slots, a pair of swing links respectively pivoted to said pins to control the oscillation of said bars, one of said links and its corresponding wrist pin having a lead over the other in their back and forth movements, a rotary shaft, a pair of rotary members mounted thereon, operative connections respectively connecting said members to their corresponding oscillating bars to rotate said members by sliding said pins in their slots, and driving means to slide said pins back and forth.

6. A mechanical movement for speeding up a rotary member, having in combination, a reciprocating driving member, a rotary driven member, and interposed mechanism characterized by an oscillating bar having a curved slot, a sliding member mounted in said slot and operatively connected to said reciprocating member, a swing link pivotally supported at one end opposite the convex side and middle of said slot and operatively connected at its other end to said sliding member so as to swing the latter end in an arc reverse to that of the slot, and a pitman having its ends operatively connected respectively to said oscillating bar and to said rotary member.

MOULTRE A. BREWER.